April 14, 1942.    F. H. MUELLER ET AL    2,279,636
CLAMPING BELT FOR CONNECTING TAPPING MACHINES TO MAINS
Filed Sept. 28, 1939
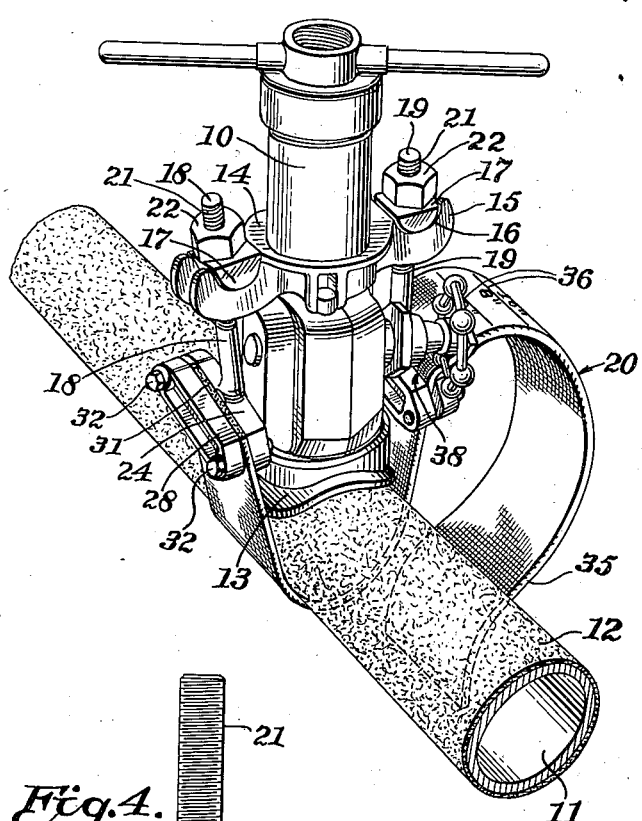
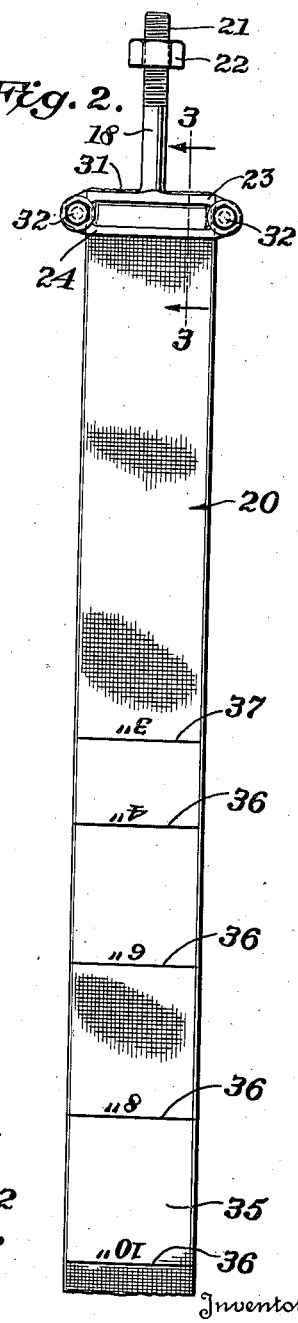
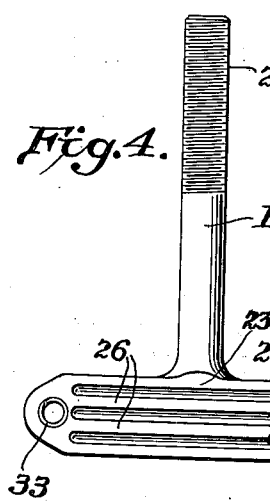
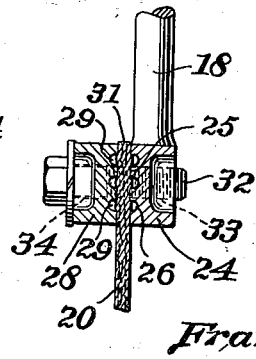
Inventors:
Frank H. Mueller,
Walter J. Bowan, Patented Apr. 14, 1942

2,279,636

UNITED STATES PATENT OFFICE 2,279,636

CLAMPING BELT FOR CONNECTING TAPPING MACHINES TO MAINS

Frank H. Mueller and Walter J. Bowan, Decatur, Ill., assignors to Mueller Co., Decatur, Ill., a corporation of Illinois Application September 28, 1939, Serial No. 297,011

7 Claims. (Cl. 77—37)

The present invention relates to improved clamping means for securing a tapping or drilling machine to a coated water main or the like.

Heretofore it has been customary to attach the tapping machine to the main by narrow metal bands or steel chains which are open to the objection, that when used on a coated pipe, the bands and links of the chain bite into and cut the yieldable coating, thus destroying the protection intended to be afforded by the coating.

An important feature of the present invention is to provide simple, efficient, and positive clamping means for firmly and securely maintaining the tapping machine in proper drilling position on coated water mains without danger of damaging the coating.

A further object consists in attaching the tapping machine to a coated water main by a flexible fabricated strap or belt of substantial width, and tightening the strap so as to be brought into firm gripping engagement with the coated main through the instrumentality of a pair of clamping members or supporting bolts detachably connected to opposite sides of the machine. Each of the clamping members is of substantially T-shape and has a depending shank arranged to be connected at its upper end to the machine. The lower end of the shank terminates in an elongated medially disposed head which extends substantially parallel to the axis of the main. Associated with the heads are complementary plates arranged to clamp the relatively wide flat end portions of the belt or strap to the clamping member so as to insure a uniform application of pressure and a tight gripping engagement of the belt with the main when the parts are set up.

Another object of the invention consists in providing the belt of surplus length so that it may be used to clamp mains of varying diameters to the tapping machine. The inner surface of the belt is provided with spaced longitudinally disposed indicia or markers arranged to coact with the edge of one of the clamping heads for indicating the proper lengths of the belt necessary to secure mains of varying diameters to the machine, thus providing simple and efficient means whereby a belt or strap of the proper length may be attached to one of the clamping members at a point remote from where the pipe is to be tapped and then subsequently connected to the machine to maintain the latter in a fixed position on the machine, and at a minimum expenditure of time and effort.

Other objects and advantages of the invention will become apparent from the following description when taken in conjunction with the accompanying claims and drawing.

Referring to the drawing in which is disclosed a preferred embodiment of the invention:

Figure 1 is a perspective view showing a tapping machine secured to a water main by our improved clamping means;

Figure 2 is a detail plan view of one end of the belt showing a clamping bolt applied thereto;

Figure 3 is a sectional view taken substantially along the line 3—3 of Figure 2;

Figure 4 is a detailed side view of one of the clamping bolts, and

Figure 5 is a detail view of one side of a plate arranged to be associated with the clamping bolt.

Referring to the drawing in which like numerals designate like parts in the several views, 10 indicates the tubular body portion of a tapping or drilling machine which is arranged to be removably mounted on a water main or pipe 11 for the purpose of drilling a hole therein and for subsequently applying a corporation stop to the main. The outer surface of the main is preferably provided with a protective coating 12 of any suitable material. The lower end of the tubular portion 10 presents a smooth uninterrupted surface of such dimensions and shape as not to destroy the coating and as shown, the lower end of the tubular body portion of the tapping or drilling machine may have an extended base or saddle gasket 13 shaped to engage the coated main at a point adjacent to where the main is to be tapped so that a substantial contact area with the protective coating of the main is provided. A yoke or collar 14 carried by the tubular portion 10 is provided with diametrically opposed outwardly extending lugs or arms 15 which preferably have their upper surfaces curved as at 16 to receive the rocking blocks 17.

In order that the machine may be firmly and securely mounted on the main 11 both during the drilling operation and when the corporation stop is connected to the main and held in stable position so that the supporting base 13 will not injure the coated main, a pair of belt-engaging or clamping members in the form of substantially T-shaped bolts 18 and 19 are arranged detachably to connect the flexible fabricated strap or belt 20 to the machine. As here shown it will be observed that the fabricated strap or belt 20 is substantially the width of the base 13 of the tapping machine so as to insure that pressures against the coated main are substantially equally distributed. The clamping members 18 and 19 are similar in shape and construction, and each has an upper threaded stem or shank 21 which extends through aligned openings in the adjacent lug 15 and block 17 disposed on one side of the collar 14. The stems 21 may be tightened on the machine above the base 13, by the nuts 22 which bear against the blocks 17 so as to adjustably maintain the parts in a fixed position. It will be observed that the belt-engaging members 18 and 19 are disposed entirely above the base 13 of the tapping machine so that all danger of the members 18 and 19 contacting or injuring the coated main is eliminated, and the main is subjected only to the pressures of the smooth uninterrupted base of the tapping machine and the smooth surface of the belt. The lower end of each of the bolts 18 and 19 has an elongated medially disposed head 23 which extends substantially parallel with the axis of the main 11. The inner surface 24 of the head 23 is preferably provided with spaced transversely disposed grooves 25 and ridges 26. Associated with each of the heads is a complementary plate or member 28 having its inner surface similarly formed with grooves 29 and ridges 30. The flat strap 20 is of substantial width but is less than the width of the elongated heads 23, so that the end portion 31 of the strap may be clamped between the head 24 and the plate 28 (Figure 3) by the threaded bolts 32 which extend through the spaced smooth openings 34 in the plate 28 and the threaded openings 33 in the head 24. When the strap 20 is secured to the head, the ridges 25 and 29 act to bite into the strap so as to prevent it from slipping. The intermediate portion of the strap 20 passes under the main 11 and is secured to the head 24 and plate 28 of the bolt 19 in substantially the same manner as the end portion 30.

The strap or belt 20 may be formed of any suitable flexible material, such as woven textile fabric, although it will be understood that it may be formed of any other suitable material which gives the desired flexibility and smoothness of contact which will prevent injury to the coated main. The fabricated strap is of sufficient width to provide a firm gripping surface for engaging the coating 12 of the main. With this construction not only is the coated main protected against injury from the fabricated strap which holds the tapping machine in place, but danger of injury to the coated main by reason of the tapping machine rocking upon its base 13 is eliminated, the pressure of the base and strap being equally distributed over the surface of the main.

As the fabricated belt or strap 20 is provided with a smooth yieldable relatively wide surface for gripping the coated main, it will not bite into or cut the coating 12 when tightly applied to the main, and thus overcomes an inherent defect prevalent in narrow metal bands or steel chains which when applied to a coated main bite into and cut through the yieldable coating and materially reduce the protection intended to be afforded by the coating.

The fabricated belt 20 preferably is of surplus length so as to be adjustable for use with mains of various diameters and sizes. The inner smooth surface 35 of the belt is provided with longitudinally disposed spaced indicia or markers 36 for indicating the proper lengths of the belt in accordance with the different diameters of the mains or pipes with which the belt is to be associated. This is a highly desirable and important feature, since the tapping machines are usually installed in ditches which are muddy and necessarily restricted as to working space. By reason of the spaced indicia 36 on the belt 20, one of the clamping members such as 19 may be initially secured to the proper length of belt in accordance with the particular diameter of the main to which the machine is to be connected, and this may be done at a point remote from where the main is to be tapped, such as on dry flat ground or in a truck, and then the clamping member and its connected belt portion may be secured to the machine and the free end of the belt moved under the main and secured to the opposite clamping member which may previously have been connected to the machine. It will be obvious that the fabricated belt 20 and its clamping and adjusting bolts 18 and 19 can be mounted on a tapping machine so as to permit the surplus length of the belt to lie on either side of the main, according to the needs of the particular job.

In setting up the machine for operation, the operator will first mark on the protective coating of the pipe the size of the hole to be tapped. The protective coating will then be cut away, following the marked portion, so as to leave the metal of the pipe exposed. The base of the tapping machine will be spotted on the main directly over the cut out portion of the protective coating, with its base surrounding this cut-away portion, so as to properly seat the machine in place, and, by reason of the smooth uninterrupted contact surface of the base of the tapping machine, without injury to that coating.

Assuming the tapping machine is to be attached to a three inch main, it will be seen that the machine 10 may be mounted on the main 11 and that the intermediate portion 37 of the strap may be clamped to the bolt 19 so as to indicate the proper length of the strap, prior to the connection of the bolt with the machine and at a point remote therefrom. The clamping bolts may then be connected to the main, and the free end portion 31 of the strap secured to the clamp 18 so that upon the tightening up of the nuts 22, the strap is brought into firm gripping engagement with the coating 12 without danger of damaging the same and thus insures the machine being firmly and fixedly secured to the main.

During the initial tightening of the bolts 18 and 19 by the nuts 22, the rocker blocks 17 allow the bolts to be moved so as to be properly positioned to exert a uniform upward pressure on the belt when the latter engages the coated main to insure the machine being firmly mounted on the main.

The upper edge 38 of the head of the bolt 19 may be utilized to coact with the indicia 36 and constitutes registering means which when the indicia 36, which indicates the proper length of the belt to be used with the particular size of main, is aligned with the edge 38 and clamped to the bolt 19 by the plate 34, the belt will be of the proper length to be applied to the tapping machine. It will be observed that this connection may be effected prior to the connection of the bolt 19 to the machine and at a point remote from where the main is to be tapped.

If it is desired to attach the machine to a main of larger diameter, this may be readily effected due to the surplus length of the strap, by clamping the belt 19 at the proper point of the strap 20 as indicated by the indicia 36 and then assembling the parts in the manner as previously described. Thus it will be seen that simple, efficient and positive means are provided for firmly securing the bolt 19 at the proper point of the strap 20 damaging the coating, and in which the strap may be connected to the machine and brought into engagement with the main at a minimum expenditure of time and effort.

It is to be understood that the form of the invention shown and described is merely illustrative of the preferred embodiment, and that such changes may be made as fall within the purview of one skilled in the art without departing from the spirit of the invention and the scope of the appended claims.

We claim:

1. In combination with a tapping machine having a main-engaging base, of means for removably mounting the machine on a coated main, said means including belt-engaging members disposed on opposite sides of the machine, a flexible belt substantially the width of the main-engaging base of the tapping machine, said base having a surface conforming to the surface of the coated main and of an area to engage the coated main without injury thereto, means above said main for connecting the belt to said belt-engaging members, and means for tightening the belt-engaging members, whereby when said members are tightened said tapping machine base and belt are brought into gripping engagement with the main so as to maintain the base of the tapping machine in stable position and prevent damage to the coated main at all points of contact of said tapping machine base and said belt.

2. In combination with a tapping machine having a main-engaging base of substantial area, of means for removably mounting the machine on a coated main, said means including belt-engaging members disposed on opposite sides of the machine, a flexible belt substantially the width of the main-engaging base of the tapping machine, means connecting the belt to said belt-engaging members, means for tightening the belt-engaging members, whereby when said members are tightened said tapping machine base and belt and brought into gripping engagement with the main so as to maintain the base of the tapping machine in stable position and prevent damage to the coated main at all points of contact of said tapping machine base and said belt, and spaced means extending longitudinally of the belt for indicating the proper length thereof in accordance with the diameter of the main to which the machine is to be applied.

3. In combination with a tapping machine having a main-engaging base, a collar on the machine positioned above said base, means for removably mounting the machine upon a coated main, said means including belt-engaging members disposed on opposite sides of the machine, a flexible belt, means above said base for connecting the belt to said belt-engaging members, means for tightening the belt-engaging members onto said collar, said belt being of substantial width and arranged when the clamping members are tightened onto the collar to be moved into firm clamping engagement with the main and to maintain the base in stable position whereby damage to the coated main at all points of contact is prevented.

4. In combination with a tapping machine having a main-engaging base, of means for removably mounting the machine on a coated main, said means including belt-engaging members disposed on opposite sides of the machine, a flexible belt, means connecting the belt to said belt-engaging members, means above said base for tightening the belt-engaging members onto the machine, said belt being of substantial width and of surplus length and arranged when the clamping members are tightened onto the machine to be moved into firm clamping engagement with the main so as to maintain the base in stable position whereby damage to the coated main at all points of contact is prevented, said belt having spaced indicia extending longitudinally thereof for indicating the proper length of the belt in accordance with the diameter of the main to which the machine is to be applied, and the head of one of said members coacting with the indicia for indicating the proper length of the belt so that the same may be attached to one of said members at a point remote from the machine.

5. In combination with a tapping machine having an extended main-engaging base of substantial area and provided with an uninterrupted main-contacting face, means for removably mounting the machine on a coated main, said means including belt-engaging members disposed on opposite sides of the machine, each of said members having a depending shank terminating at its lower end in an elongated transversely disposed head extending substantially parallel to the axis of the main, a flexible belt substantially the width of the main-engaging base, means above said base for connecting the belt to the heads of said members, and means for tightening the shanks onto the machine so that when said members are tightened, the face of the base and belt are brought into gripping engagement with the main to maintain the base in stable position and prevent damage to the coated main at all points of contact of said base and said belt.

6. In combination with a tapping machine having a main engaging base of substantial area, means for removably mounting the machine on a coated main, said means including clamping members disposed on opposite sides of the machine, each of said members having a depending shank terminating at its lower end in an elongated transversely disposed head extending substantially parallel to the axis of the main, means for tightening the shanks onto the machine, a plate associated with each of said heads, means for detachably connecting each head to its complementary plate, and a flexible belt of surplus length and substantially the width of the base, said belt arranged to engage the under side of the main and have its end portions adjustably connected to the clamping members between the complementary heads and plates so that upon the machine being mounted on the main and the clamping members and belt being connected thereto, the base and belt are brought into firm engagement with the main to maintain the base of the tapping machine in stable position and prevent damage to the coated main at all points of contact of said base and said belt therewith, said clamping members and plates being constructed and arranged so that the belt may be initially drawn freely through one of the heads and its complementary plate to provide a loop of approximately the proper length and then be connected at one end to the head of the other of said clamping members and subsequently secured to the first mentioned clamping member.

7. In combination with a tapping machine having a main-engaging base of substantial area, means for removably mounting the machine on a coated main, said means including clamping members disposed on opposite sides of the machine, each of said members having a depending shank terminating at its lower end in an elongated transversely disposed head extending substantially parallel to the axis of the main, means for tightening the shanks to the machine, a plate associated with each of said heads, means for detachably connecting each head to its complementary plate, a flexible belt of surplus length and substantially the width of the base, said belt arranged to engage the under side of the main and have its end portions adjustably connected to the clamping members between the complementary heads and plates so that upon the machine being mounted on the main and the clamping members and belt being connected thereto, the base and belt are brought into firm engagement with the main to maintain the base of the tapping machine in stable position and prevent damage to the coated main at all points of contact of said base and said belt therewith, said clamping members and plates being constructed and arranged so that the belt may be initially drawn freely through one of the heads and its complementary plate to provide a loop of approximately the proper length and then be connected at one end of the head of the other of said clamping members and subsequently secured to the first mentioned clamping member, said belt having spaced indicia extending longitudinally thereof for indicating the proper length of the belt in accordance with the diameter of the main to which the machine is to be applied, and the head of one of said members co-acting with the indicia to indicate the proper length of the belt in order that the belt may be attached to one of the clamping members at a point remote from the machine.

FRANK H. MUELLER.
WALTER J. BOWAN.